United States Patent Office 3,154,578
Patented Oct. 27, 1964

3,154,578
PROCESS FOR THE SIMULTANEOUS CLEAVING AND ACYLATION OF ALKANOIC ACID NITRONES
Robin B. Kinnel, Cambridge, Mass., and Erwin F. Schoenewaldt, Westfield, N.J., assignors to Merck & Co., Inc., Rahway, N.J., a corporation of New Jersey
No Drawing. Filed Dec. 13, 1961, Ser. No. 159,491
15 Claims. (Cl. 260—534)

This invention relates to a process for preparing derivatives of aliphatic acids. More particularly it relates to a process for preparing N-substituted hydroxyamino aliphatic acids and derivatives thereof. Specifically, the invention relates to a process for cleaving and acylating N-lower aliphatic acid nitrones and derivatives thereof to obtain the corresponding N-acyl hydroxyamino acid and derivatives thereof.

It has recently been discovered that certain N-acylated hydroxyamino aliphatic acids and salts and esters thereof are useful in preventing the growth of undesirable plants such as crab grass, dandelions and poison ivy. The methods heretofore employed for obtaining these compounds contemplate the acid hydrolysis of N-lower aliphatic acid nitrones, and subsequent acylation of the hydrolyzed product. For example, nitrones of aliphatic acids having the general formula

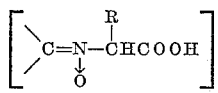

and esters and salts thereof, wherein the

is the nitrone group, and R is an alkyl radical or hydrogen, were hydrolyzed in an aqueous acidic medium to cleave the double bond of the nitrone, and yield the corresponding hydroxyamino compound. It was then necessary to isolate this substance and acylate it in a second separate reaction. One of the problems presented by such a method is the partial decomposition of the hydrolyzed unacylated product in the acidic medium. It would be very desirable to have a process whereby the cleavage of the acid nitrones and their derivatives and the acylation of the nitrogen atom could be effected simultaneously at the carbon-nitrogen double bond linkage to produce the N-acylated hydroxyamino acids and derivatives thereof directly. It is one object of this invention to provide such a process. Further objects of the invention will become more apparent when consideration is given to the following detailed disclosure.

In accordance with the present invention it has been discovered that nitrones may be cleaved at the —C=N— double bond, and the nitrogen atom simultaneously acylated by treating the nitrone with an acylating agent in an anhydrous medium. The following structural flow diagram, shown with reference to nitrones of lower aliphatic acids, illustrates the process of the invention:

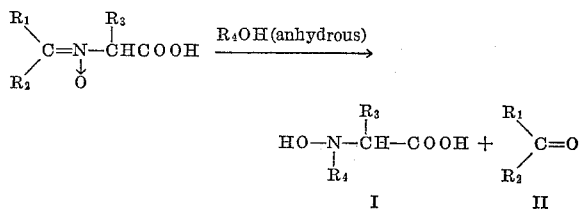

wherein $R_1$ and $R_2$ may be any of a wide variety of substituents such as, for example hydrogen, alkyl, alkoxy, substituted and unsubstituted aromatic, cyclic and heterocyclic radicals, and further exemplified by the methyl, ethyl, butyl, methoxy, propoxy, phenyl, alkyl phenyl, methoxy phenyl, cyclopentyl cycloheptyl, furyl, oxazolyl, and thiazolyl, $R_3$ may be hydrogen or lower alkyl such as methyl, ethyl, propyl, butyl and the like, and $R_4$ is a lower alkanoyl radical such as formyl, acetyl, propionyl, butyryl and the like or an aroyl radical such as benzoyl. Although the above diagram is shown with reference to the free acids as starting materials, it will be understood that the process of the present invention applies also to the alkali metal and alkaline earth metal salts and esters of the aliphatic acid nitrones. Illustrative of these latter named compounds are the sodium, potassium, calcium and magnesium salts and the methyl, ethyl, propyl, and butyl esters of the acids. It will further be noted that the above reaction results also in the production of a carbonyl compound II, the substituents of which, $R_1$ and $R_2$, are identical to those present on the corresponding moiety of the nitrone. To this extent, these substituents take no part in the present invetnion, and are not considered to be critical. Hence, the foregoing list of radicals defining $R_1$ and $R_2$ is merely illustrative, and should in no way be construed as limiting the nature of the starting material.

According to the present invention, it has been found that the desired simultaneous N-acylation and cleavage of the —C=N— linkage of nitrones is effectively accomplished by treating the nitrone with an organic acid under substantially anhydrous conditions. The organic acid may be designated structurally as

RCOOH wherein R is hydrogen, a lower alkyl radical or a phenyl radical. Where formylation of the nitrone is desired, good results are obtained when substantially anhydrous formic acid alone is used as the acylating agent. A preferred formylating agent however, comprises a mixture of formic acid and an acid anhydride. Illustrative of these are formic acid-acetic anhydride, and formic acid-propionic anhydride. The particular acid anhydride used where formylation is desired is not critical, however, for the reason that the nitrones referred to are particularly susceptible of N-formylation, even in the presence of higher acyl homologs, and will preferentially undergo formylation rather than higher acylation.

Where it is desired to introduce other acyl radicals at the nitrogen atom of the nitrone, such as for example the acetyl, propionyl, butyryl, benzoyl radicals and the like, the acylating acid must be used in conjunction with a quantity of an acid anhydride. When using such mixtures, it is preferred that the acid anhydride employed have the same acyl radical as the acid itself, although this is not critical. For example, a suitable acetylation mixture comprises acetic acid and acetic anhydride; a suitable propionylating agent comprises propionic acid and propionic anhydride; a suitable benzoylating agent comprises benzoic acid and benzoic anhydride and so on for other acylating mixtures. When the acylating mixture is a solid, as in the case of benzoic acid-benzoic anhydride, it is preferred to carry out the reaction in the presence of an inert solvent such as benzene, toluene, ether and the like. It will be understood however, that the aforementioned mixtures merely represent preferred acylating agents and that the process of the present invention will be effective to cleave and N-acylate the nitrones where acids and anhydrides of mixed acyl radicals are employed.

The actual amount of anhydrous acid supplied to the reaction is not critical. However for practical purposes it is preferred to supply at least the stoichiometric amount, one mole of acid being provided for every mole of nitrone being cleaved and acylated. Normally a slight molar excess is employed. Where an acid anhydride is used in admixture with the acid, a sufficient amount of anhydride should be supplied to consume any free water with an additional amount of the anhydride left over. The actual quantity left over is not critical, suitable results being obtained when it is present in the range of from 10–200 mole percent based on the nitrone. In addition, the acid and/or anhydride may serve as a solvent, in which case either may be present in larger excess.

The temperature at which the reaction is carried out is not critical and good results are obtained at temperatures ranging from 0° C. to 75° C. Higher temperatures may be employed where such temperatures do not lead to the decomposition of any of the reactants or of the desired final product. At the higher temperatures, the reaction will normally go to completion in about an hour, while lower temperatures tend to increase the reaction time to about 15 hours. It is preferred to use a temperature in the range of from 25° C.–40° C.

At the conclusion of the reaction, the desired product is obtained as the acid, salt or ester depending on whether the free acid nitrone, or its salts or esters are used as starting materials. When the free acid is formed, it is preferred to extract it into water and then convert it to metal salt by the addition of appropriate amounts of sodium hydroxide or potassium hydroxide, for example. Aqueous base may be used to obtain the salt, and in such a case the product will generally be obtained in the hydrated form. Alternatively, when the base is dissolved in an organic alcohol such as methanol or ethanol, the final product is obtained as the unhydrated salt of the particular base used. Precipitation of the salt may be facilitated by the further addition to the salt solution of a water-miscible solvent such as ethanol, acetone or the like.

The starting materials used in the process of the present invention may be prepared according to the general method taught in Annalen, volume 289, page 307. As taught therein, the high melting, stable, anti-isomer of an aldoxime or ketoxime is reacted with an α-halo aliphatic acid in a basic medium to produce the nitrone of the aliphatic acid. The acid nitrone may then be treated in accordance with the present invention to yield the N-acylated hydroxyamino aliphatic acid and the aldehyde or ketone corresponding to the particular aldoxime or ketoxime employed in the preparation of the acid nitrone. Inasmuch as the aldehyde or ketone is regenerated, it will be apparent that the particular aldoxime or ketoxime used in the preparation of the acid nitrone is immaterial, provided the nitrone is produced.

The following examples are given for purposes of illustration only and are not intended to limit the scope of the present invention.

EXAMPLE I

*N-Formylhydroxyaminoacetic Acid*

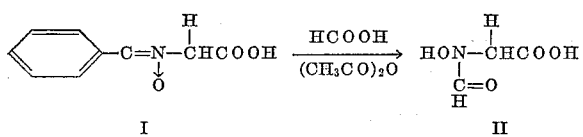

7.0 g. of isobenzaldoxime acetic acid I, is added to 50 ml. of 98% formic acid. The resulting slurry is stirred and then treated with 10 ml. of acetic anhydride, stirred at 20° C. for 20 minutes, then at 40° C. for 30 minutes. The excess formic acid, acetic acid and acetic anhydride are removed in vacuo at 35° C. The residual oil is next diluted with 8 ml. of water then with 10 ml. of benzene and the mixture stirred. The aqueous layer is separated from the organic layer and evaporated to dryness in vacuo at 35° C. yielding the solid product, N-formylhydroxyaminoacetic acid, II.

When an equivalent amount of isobenzaldoxime α-propionic acid III is used in place of the isobenzaldoxime acetic acid II, and the above procedure repeated, N-formylhydroxyamino α-propionic acid IV is obtained. The following flow diagram illustrates the conversion.

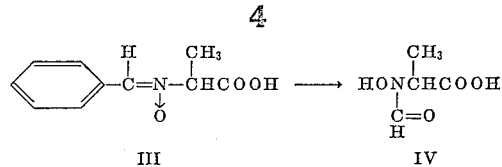

When the above procedure is repeated using an equivalent amount of sodium or potassium isobenzaldoxime acetate in place of isobenzaldoxime acetic acid, the corresponding sodium or potassium N-formyl hydroxyamino acetate dihydrate is obtained.

When the foregoing procedure is repeated using substantially anhydrous formic acid, and no acetic anhydride, the corresponding N-formylated acids are obtained.

EXAMPLE II

*Sodium N-Formylhydroxyaminoacetate Dihydrate*

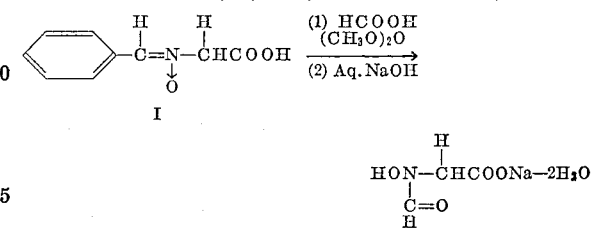

The procedure of Example I is repeated with the exception that the aqueous layer containing the product is neutralized by the addition of 8 N aqueous sodium hydroxide to a pH of 6–7. To the stirred neutralized mixture is slowly added 150 ml. of ethanol and the product, sodium N-formylhydroxyaminoacetate dihydrate V precipitates. The resulting slurry is stirred for 1 hour at 5–10° C. after which the slurry is filtered and the precipitate washed with 2 x 10 ml. of ethanol, then vacuum dried.

When ethanolic or methanolic sodium hydroxide is used in the above procedure as the neutralizing agent in place of aqueous sodium hydroxide, the unhydrated salt, sodium N-formylhydroxyaminoacetate is obtained.

Similarly, when an equivalent strength of potassium hydroxide solution is used in place of the sodium hydroxide solution in the above procedure, the corresponding potassium salts are obtained.

In like fashion, when isobenzaldoxime α-propionic acid III is used in place of the isobenzaldoxime acetic acid I, the corresponding sodium or potassium propionates are obtained.

EXAMPLE III

*Sodium N-Acetyl Hydroxyaminopropionate Dihydrate*

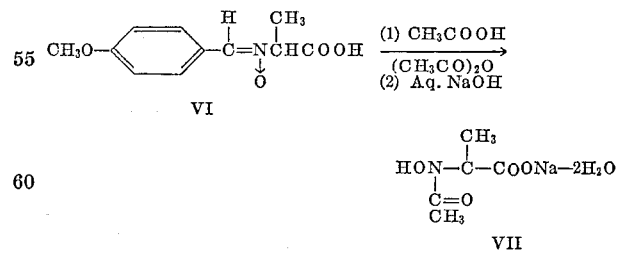

8.15 g. of isoparamethoxybenzaldoxime α-propionic acid VI is stirred with 20 mls. of glacial acetic acid. The resulting slurry is then treated with 10 mls. of acetic anhydride and stirred at 20° C. for ½ hour and then at 40–45° C. for an additional ½ hour. The excess acetic acid and acetic anhydride are removed in vacuo at 35° C. The residual oil is next stirred with 10 mls. of water and 10 mls. of benzene. The aqueous layer is separated from the benzene layer and neutralized to a pH of 6–7 with 8 N sodium hydroxide solution. The neutralized solution is then diluted with 150 ml. of ethanol with stirring and the product, sodium N-acetyl hydroxyamino α-propionate dihydrate VII precipitates. The product is then washed and dried in accordance with the procedure given in Example II.

When the above procedure is repeated using equivalent amounts of butyric acid and butyric anhydride as the acylating agent in place of the acetic acid-acetic anhydride mixture, sodium N-butyryl hydroxyamino α-propionate is obtained.

When an equivalent amount of magnesium hydroxide or calcium hydroxide is used in place of the sodium hydroxide and the above procedure repeated, the corresponding magnesium or calcium salts are obtained.

EXAMPLE IV

*N-Propionyl Hydroxyaminoacetic Acid*

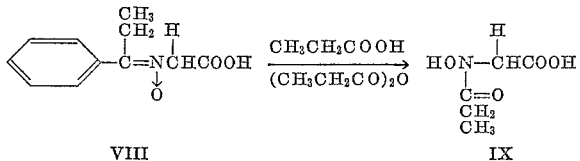

8.0 g. of isopropiophenonoxime acetic acid VIII is mixed and stirred with 20 mls. of propionic acid and 10 mls. of propionic anhydride. The resulting slurry is stirred at 20° for 45 minutes and then at 40° C. for 1 hour. The excess propionic acid and propionic anhydride are removed in vacuo at 35° C. The residue is diluted with 10 mls. each of water and benzene and stirred. The aqueous phase is separated and evaporated to dryness in vacuo at 35° C. There is thus obtained the product N-propionyl hydroxyamino acetic acid IX.

When the above procedure is repeated using isopropiophenonoxime α-butyric acid X, in place of the isopropiophenonoxime acetic acid VIII, there is obtained N-propionyl hydroxyamino α-butyric acid XI. The following flow diagram illustrates the conversion.

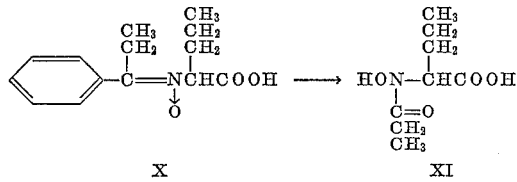

EXAMPLE V

*N-Benzoylhydroxyamino Acetic Acid*

The procedure is that of Example I with the exception that equivalent amounts of benzoic acid and benzoic anhydride are used in place of the formic acid-acetic anhydride mixture. The product N-benzoylhydroxyamino acetic acid is obtained.

EXAMPLE VI

*Alkyl-N-Acylhydroxyamino Alkanoates*

When the procedures in the foregoing examples are repeated using the methyl, ethyl, propyl or butyl esters of the aliphatic acid nitrones, the corresponding alkyl esters of the N-acylhydroxyamino α-aliphatic acids are obtained.

All changes and modifications as come within the scope of the present invention are intended to be encompassed within the appended claims.

What is claimed is:

1. The method for cleaving the double bond of a —C=N— linkage of a nitrone of an alkanoic acid and simultaneously acylating the nitrogen atom thereof which comprises contacting a nitrone of an alkanoic acid with a mixture of an acid anhydride of the formula $(R_1CO)_2O$ and a compound of the general formula RCOOH wherein R and $R_1$ are selected from the group consisting of lower alkyl and phenyl radicals, said contacting taking place in a substantially anhydrous medium.

2. The method for cleaving the double bond of a —C=N— linkage of a nitrone of an alkanoic acid and simultaneously formylating the nitrogen atom thereof which comprises contacting a nitrone of an alkanoic acid with formic acid in a substantially anhydrous medium.

3. The method for producing N-formylated hydroxyamino lower alkanoic acids, which comprises contacting a nitrone of a lower alkanoic acid with formic acid in a substantially anhydrous medium.

4. The method for producing N-acylated hydroxyamino lower alkanoic acids, which comprises contacting a nitrone of a lower alkanoic acid with a mixture of an acid anhydride of the formula $(R_1CO)_2O$ and a compound of the general formula RCOOH wherein R and $R_1$ are selected from the group consisting of lower alkyl and phenyl radicals, said contacting taking place in a substantially anhydrous medium.

5. The method of producing N-formyl hydroxyamino lower alkanoic acids and lower alkyl esters thereof which comprises contacting a compound selected from the group consisting of lower alkanoic acid nitrones, and lower alkyl esters thereof with formic acid in a substantially anhydrous medium.

6. The method according to claim 5 wherein the process is carried out in the presence of a metal ion selected from the group consisting of alkaline earth metals and alkali metals.

7. The method of producing N-formyl hydroxyamino lower alkanoic acids and derivatives thereof which comprises contacting a compound selected from the group consisting of lower alkanoic acid nitrones and lower alkyl esters thereof with a mixture of formic acid and an acid anhydride of the formula $(R_1CO)_2O$ where $R_1$ is selected from the group consisting of lower alkyl and phenyl, said contacting taking place in a substantially anhydrous medium.

8. The method according to claim 7 wherein the acid anhydride is acetic anhydride.

9. The method of producing N-formylhydroxyamino acetic acid which comprises contacting a nitrone of acetic acid with formic acid in a substantially anhydrous medium.

10. The method according to claim 9 wherein the nitrone is isobenzaldoxime acetic acid.

11. The method of producing N-formylhydroxyamino acetic acid which comprises contacting a nitrone of acetic acid with formic acid in the presence of acetic anhydride, said contacting taking place in a substantially anhydrous medium.

12. The method according to claim 11 wherein the process is carried out in the presence of a metal ion selected from the group consisting of alkaline earth metals and alkali metals to produce the metal salt of N-formyl hydroxyamino acetic acid.

13. The method according to claim 11 wherein the nitrone is isobenzaldoxime acetic acid.

14. The method of producing N-acetyl hydroxyamino lower alkanoic acids and lower alkyl esters thereof which comprises contacting a compound selected from the group consisting of lower alkanoic acid nitrones, and lower alkyl esters thereof with a mixture of acetic acid and an acid anhydride of the formula $(R_1CO)_2O$ where $R_1$ is selected from the group consisting of lower alkyl and phenyl, said contacting taking place in a substantially anhydrous medium.

15. The method of producing N-acetyl hydroxyamino acetic acid which comprises contacting a nitrone of acetic acid with acetic acid in the presence of acetic anhydride, said contacting taking place in a substantially anhydrous medium.

No references cited.